(12) United States Patent
Yano et al.

(10) Patent No.: US 10,886,970 B2
(45) Date of Patent: Jan. 5, 2021

(54) LOAD DRIVE SYSTEM AND LOAD DRIVE METHOD

(71) Applicant: HITACHI AUTOMOTIVE SYSTEMS, LTD., Hitachinaka (JP)

(72) Inventors: Tomohiko Yano, Tokyo (JP); Hiroki Yamashita, Tokyo (JP); Taizo Yamawaki, Tokyo (JP); Atsushi Arata, Hitachinaka (JP); Mitsuhiko Watanabe, Hitachinaka (JP); Ryusuke Sahara, Hitachinaka (JP); Kenichi Hoshino, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/494,157

(22) PCT Filed: Aug. 31, 2017

(86) PCT No.: PCT/JP2017/031331
§ 371 (c)(1),
(2) Date: Sep. 13, 2019

(87) PCT Pub. No.: WO2018/179483
PCT Pub. Date: Oct. 4, 2018

(65) Prior Publication Data
US 2020/0014424 A1 Jan. 9, 2020

(30) Foreign Application Priority Data
Mar. 27, 2017 (JP) .................................. 2017-061214

(51) Int. Cl.
*H04B 3/54* (2006.01)
*B60R 16/023* (2006.01)
(Continued)

(52) U.S. Cl.
CPC ............ *H04B 3/542* (2013.01); *B60R 16/023* (2013.01); *H04B 3/46* (2013.01); *H04B 3/546* (2013.01); *H04L 25/4902* (2013.01)

(58) Field of Classification Search
CPC ............... B60R 16/023; H04L 25/4902; H04L 25/0264; H04L 25/028; H04L 25/02;
(Continued)

(56) References Cited

U.S. PATENT DOCUMENTS

2004/0207263 A1* 10/2004 Yanagida .......... H04L 12/40032
307/10.1
2008/0018465 A1 1/2008 Ootaka
(Continued)

FOREIGN PATENT DOCUMENTS

JP 2007-306209 A 11/2007
JP 2010-213022 A 9/2010

OTHER PUBLICATIONS

International Search Report dated May 12, 2017 for the PCT International Application No. PCTJP2017/031331.

*Primary Examiner* — Sam K Ahn
*Assistant Examiner* — Amneet Singh
(74) *Attorney, Agent, or Firm* — Volpe Koenig (57) ABSTRACT

A load drive system for driving a load supplied with power from a power line includes a control unit which controls switching between the power line and the load and a communication unit which communicates using voltage and current of the power line. When performing the switching, the control unit controls, based on a width of a transition period of the power-line current, the transition period being attributable to the switching, timing of the switching so as to move the transition period away from a center of a period corresponding to a symbol communicated by the communication unit.

11 Claims, 9 Drawing Sheets

(51) Int. Cl.
*H04B 3/46* (2015.01)
*H04L 25/49* (2006.01)
(58) Field of Classification Search
CPC . H04B 3/54; H04B 3/542; H04B 3/46; H04B 3/546
See application file for complete search history.

(56) References Cited

U.S. PATENT DOCUMENTS

2010/0118983 A1* 5/2010 Weber ............... H04B 3/548
                                                    375/257
2013/0294532 A1* 11/2013 Inagawa ............ H04B 3/542
                                                    375/257
2018/0331854 A1* 11/2018 Nickel ............... H04L 12/10

\* cited by examiner

LOAD DRIVE SYSTEM AND LOAD DRIVE METHOD

INCORPORATION BY REFERENCE

This application claims priority of Japanese Patent Application No. 2017-61214, which is a Japanese patent application filed on March 27, Heisei 29 (2017), and is incorporated into the present application by reference.

TECHNICAL FIELD

The present invention relates to technology for driving a load such as an actuator provided with a power-line communication device.

BACKGROUND ART

In recent years, for automobiles, with electronic control units (ECU) for vehicle control growing higher in accuracy and function, a large number of sensors for obtaining various vehicle information including vehicle periphery information and actuators for controlling various vehicle parts have come to be mounted and, as a result, the number of wires coupling such devices and the ECU has remarkably increased. When the number of wires increases, the automobile production cost increases and, further, resultant increases in automobile weight cause a problem of fuel efficiency deterioration. Hence, there is a demand for reduction of the number of wires by wire consolidation and elimination. As a method of reducing the number of wires, power-line communication technology is available in which a communication circuit is provided over sensors and actuators, and power supply and communications for control are implemented for plural sensors and actuators using a pair of wires, thereby eliminating communication wires which used to be separately provided. Generally, for actuators used for vehicle-mounted solenoid valves, motors, etc., switching control by PWM control is performed. This causes large transition currents to be generated on the power line, so that, for power-line communication devices including actuators, it is important to prevent communication errors caused by transition currents. As methods for such error prevention, those disclosed in patent literature 1 and 2 are known. According to patent literature 1, the use of a power line is time-divided into two communication phases, i.e., a power feed phase in which power feeding only is performed and a communication phase in which communication only is performed, thereby preventing communications from being affected by noise caused by power feeding. According to patent literature 2, communication operation is performed only after a certain amount of time passes from the time of actuator switching, thereby avoiding effects of transition currents generated immediately after switching.

CITATION LIST

Patent Literature

Patent literature 1: Japanese Unexamined Patent Application No. 2007-306209
Patent literature 2: Japanese Unexamined Patent Application No. 2010-213022

SUMMARY OF INVENTION

Technical Problem

According to patent literature 1, the use of a power line is divided into a communication phase and a power feed phase so as to prevent communications from being affected by power feeding. In this way, power feeding from a DC power supply of a master station to a slave station becomes intermittent. This requires the slave station to be provided with a power supply circuit having a storage function for use in generating a DC voltage to be supplied to the actuator of the slave station. However, this poses a problem that, since operating the actuator requires a large current, the capacitor used as a storage is required to have a large capacity resulting in a problem of high cost.

According to patent literature 2, the power feed and communication period is not divided. This allows actuators to be continuously fed with power, so that a storage function as required according to patent literature 1 is not required. However, in cases where such plural actuators and sensors are coupled to a same power line, communication is interrupted every time an actuator is switched by PWM control. This frequently causes communication stoppage and restoration and lowers effective communication speed. On the other hand, since all sensors and actuators coupled to a same power line are required to complete their control and communication within a desired time period, the number of actuators and sensors couplable to the same power line is reduced.

Hence, a power-line communication device which, in a situation where plural actuators and sensors are coupled to a same power line with the power line being continuously fed with power from a DC power supply, can avoid transition currents of actuators without increasing communication time is desired.

Solution to Problem

To solve the above problem, a typical example of the present invention will be described. A load drive system for driving a load supplied with power from a power line includes a control unit which controls switching between the power line and the load and a communication unit which communicates using voltage and current of the power line. When performing the switching, the control unit controls, based on a width of a transition period of the power-line current, the transition period being attributable to the switching, timing of the switching so as to move the transition period away from a center of a period corresponding to a symbol communicated by the communication unit.

Advantageous Effects of Invention

According to one aspect of the present invention, while being continuously fed with power from a master station through a power line, each slave station independently controls timing of actuator switching at the slave station such that the transition current resulting from actuator switching at the slave station is generated in a period which does not affect communication performed on the power line. Therefore, a power-line communication network coupled with plural actuators can be configured at low cost without allowing an increase in the number of slave stations to lower communication speed. Other objects, configurations and effects than those described above will become apparent from description of the following embodiments.

DESCRIPTION OF EMBODIMENTS

As embodiments, an actuator provided with a power-line communication device and the power-line communication device will be disclosed through some practical examples. The power-line communication device provided with an actuator includes a transition period estimation unit which, based on the value of current flowing through the actuator, calculates the time width of a transition current to be generated on the power line as a result of the next switching of the actuator. It also includes a timing control unit which, based on an estimated noise width value, adjusts the difference between the phase of a drive pulse supplied to an inverter which performs switching of the actuator and the phase of a communication clock cycle on the power line.

Switching of the actuator causes the current waveform on the power line to make transition for a certain period of time from immediately after the switching. At the same time, the voltage on the power line is also disturbed. Whether the transition causes a communication error depends on the timing of transition current generation. In receiving circuits included in both a control station and a slave station, a communication symbol value is sampled at a certain timing. If a transition current occurs at the timing, it is detected as a large noise and a communication error results. If the transition current occurs at a different timing, no communication error is caused. Of a communication symbol period dependent on a symbol rate, timing away from a center of the period is not used for sampling. Therefore, communication error occurrences can be minimized by, based on the transition period width, switching the actuator at a timing coming earlier than a communication symbol boundary such that the transition occurs at a timing of the boundary between communication symbols.

With the above configuration, it is possible to realize communication using a power line in a situation where actuator switching is performed while power is continuously fed from the power line.

First Embodiment

Figure 1:
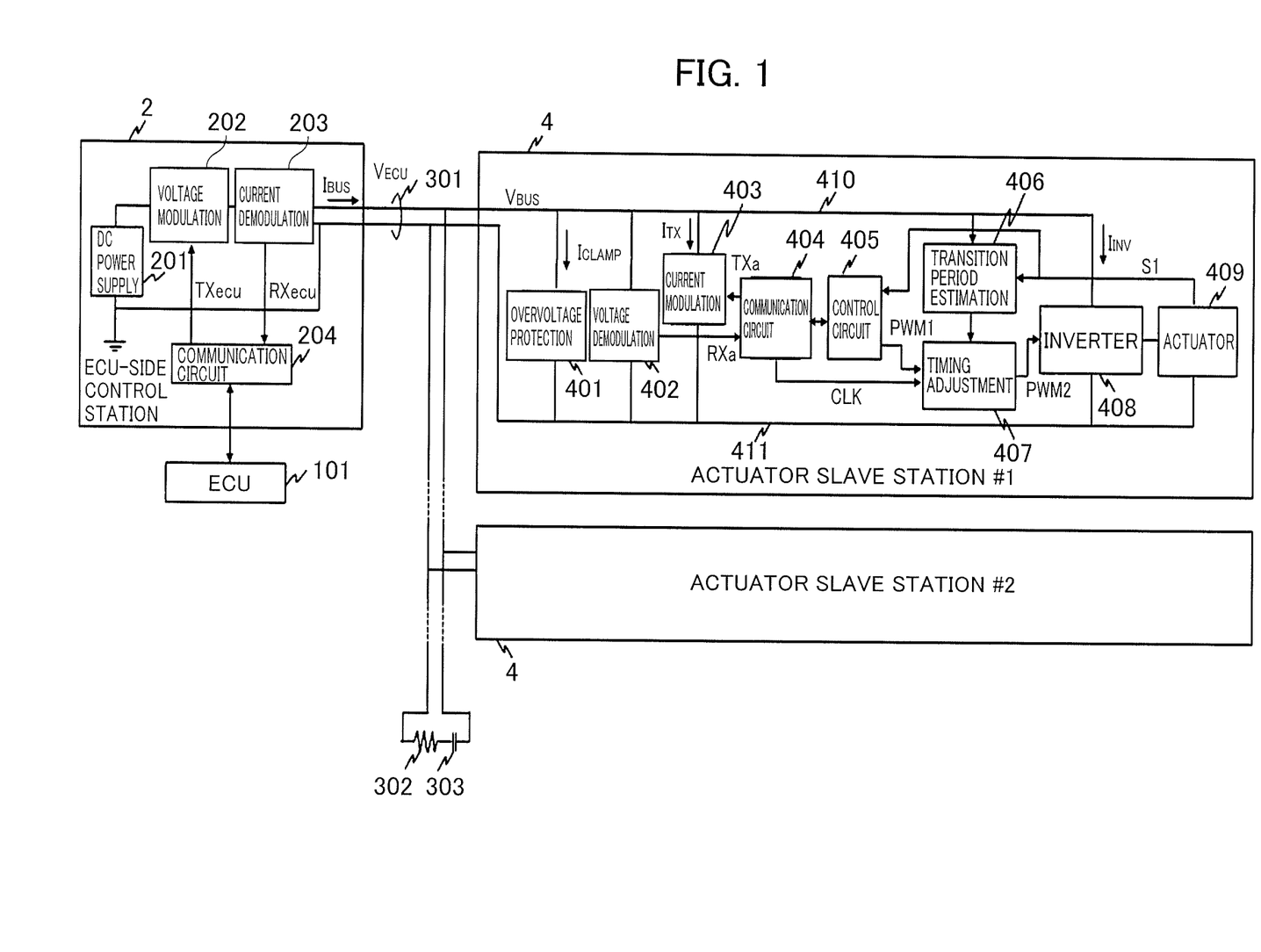
FIG. 1 is a block diagram showing an example of an overall configuration of an actuator with a power-line communication device and the power-line communication device according to a first embodiment of the present invention.

FIG. 1 is a block diagram showing an example of an overall configuration of an actuator provided with a power-line communication device and the power-line communication device according to a first embodiment of the present invention.

An electronic control device includes an ECU (Electronic Control Unit) 101, an ECU-side control station 2 provided with a DC power supply 201, a power line bus 301, and an actuator slave station 4. The actuator slave station 4 is coupled to the power line bus 301 either singularly or plurally. The ECU 1 and the actuator slave station 4 exchange data with the ECU-side control station 2 via the power line bus 301. As a basic method of communication, baseband communication using current is performed for uplink communication from the slave station 4 to the control station 2 and baseband communication using voltage is performed for downlink communication from the control station 2 to the slave station 4. The reason for using current for uplink communication is that, with the control station 2 behaving as a DC power supply, its impedance seen from the power line 301 is low making it difficult to deliver voltage signals from the slave station 4 to the control station 2.

The ECU-side control station 2 includes a DC power supply 201, a voltage modulator 202, a current demodulator 203 and a communication circuit 204. The communication circuit 204 exchanges transmission/reception data with the ECU 101, encodes/decodes data transmitted/received to/from the actuator slave station 4, and controls a communication protocol. To be specific, the communication circuit 204 passes transmission data $TX_{ecu}$ for transmission to the actuator slave station 4 to the voltage modulator 202 and receives reception data $RX_{ecu}$ from the current demodulator 203.

The voltage modulator 202 includes an encoder (not shown) and a voltage regulator (not shown). The encoder converts the transmission data $TX_{ecu}$ into Manchester code of a predetermined bit rate and the variable voltage regulator drops the voltage of the DC power supply 201 at a predetermined amplitude and supplies the dropped voltage to the power line 301, thereby generating a downlink communication signal.

The current demodulator 203 includes a decoder (not shown) and a current detector (not shown), captures, by having the current detector observe a current waveform $I_{BUS}$ flowing through the power line 301, a current signal transmitted for uplink communication from the slave station 4 and, by having the decoder identify the received data, transmits the received data as RXecu to the communication circuit 204.

The actuator slave station 4 includes an actuator 409, an overvoltage protection circuit 401 for protecting the circuit from an excessive bus voltage $V_{BUS}$, a voltage demodulator 402 for receiving a voltage signal for downlink communication from the control station 2, a current modulator 403 for sending out a current signal for uplink communication opposite to downlink communication, a communication circuit 404 for controlling a communication protocol, an actuator control circuit 405 for controlling the actuator in accordance with instructions from the ECU 101, an inverter 408 for driving the actuator, a transition period estimator 406 for estimating in advance the width of a period of transition current generation on the power line attributable to actuator switching by the inverter, and a timing adjuster 407 for adjusting the timing of inverter switching.

Also, to improve communication waveform quality, a bus termination resistor 302 for impedance matching and a DC blocking capacitor 303 can be attached to an end of the power line. The termination resistor may be built into the actuator.

Figure 2:
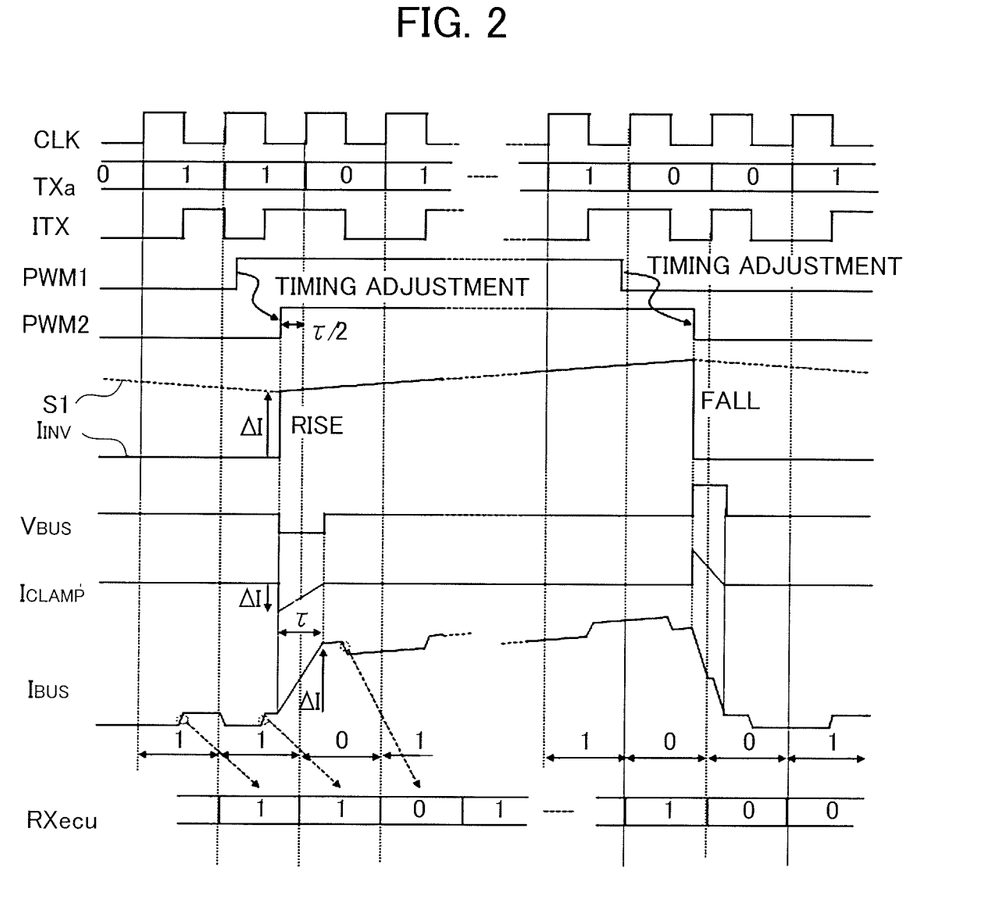
FIG. 2 is a timing chart showing waveforms at and operation timings of different parts at the time of uplink communication operation from an actuator slave station to a control station and switching timing adjustment operation according to the first embodiment of the present invention.

FIG. 2 is a timing chart showing waveforms at and operation timings of different parts at the time of uplink communication operation from the actuator slave station 4 to the control station 2 and switching timing adjustment operation according to the first embodiment of the present invention.

First, in accordance with a communication clock CLK and transmission data $TX_a$, the current modulator 403 causes a current signal $I_{TX}$ to flow on the power line. In this case, Manchester code is used as a transmission channel code. In Manchester code, one symbol is divided into two periods, that is, a first half and a second half, and the level difference between the two periods represents a bit value. Therefore, even when a current value received on the ECU side includes an unknown offset, a bit value can be determined. The communication clock CLK is synchronized, using an internal clock of the control station as a master, between all slave stations. Though details will be described later, this synchronization is achieved by sending a synchronization signal from the control station to each slave station.

When the control circuit 405 for controlling the actuator requests the inverter 408 to perform switching, a switching signal PWM1 transitions. If a request for actuator switching is directly inputted to the inverter without any control, the inverter results in switching the actuator at once causing current $I_{INV}$ that the inverter draws from the power line to change by ΔI in a step-like manner. The value of ΔI represents the value of the current flowing through the inductive actuator.

Figure 3:
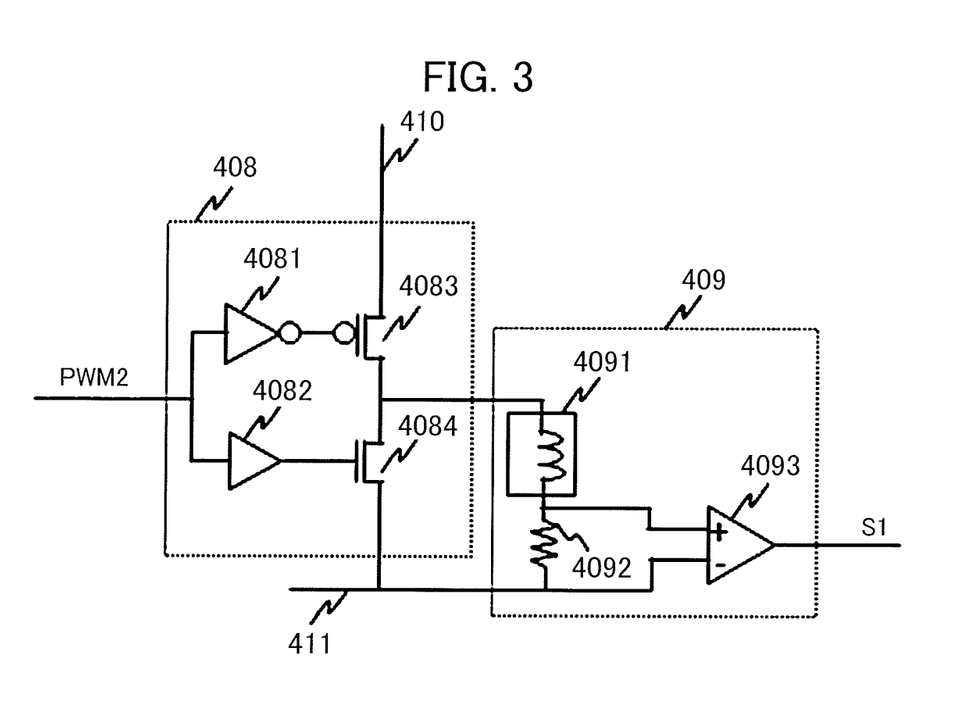
FIG. 3 is an explanatory diagram showing configuration examples of an inverter and an actuator according to the first embodiment of the present invention.

FIG. 3 is an explanatory diagram showing configuration examples of the inverter 408 and the actuator 409 according to the first embodiment of the present invention.

The inverter 408 includes a P-type MOSFET 4083, an N-type MOSFET 4084, and drivers 4081 and 4082 for driving them. The inverter 408 applies a rectangular-wave voltage to the actuator 409 by exclusively tuning on the two MOSFETs based on the switching signal supplied from the switching timing adjuster 407. The actuator 409 includes an electric unit 4091 to be applied with a voltage, current detection means 4092 and 4093 for detecting a value of current flowing through the actuator 409. The current value of the actuator 409 is taken out as signal S1 and is used by the control circuit 405 to control the actuator 409. The current flowing through the actuator 409 is the output current of the inverter, so that the current detection means 4092, etc. may be provided inside the inverter.

When the inverter draws current by ΔI in a step-like manner from the power line, the power-line current $I_{BUS}$ cannot immediately increase by ΔI due to the inductance of the power line between the control station having a power supply and each slave station. Therefore, if ΔI is positive, the power line voltage $V_{BUS}$ on the slave station side decreases and, after being clamped at a lower-limit voltage V1 by the overvoltage protection circuit, a current is supplied from the overvoltage protection circuit. Conversely, when ΔI is negative, $V_{BUS}$ is clamped at an upper-limit voltage of the overvoltage protection circuit.

Figure 4:
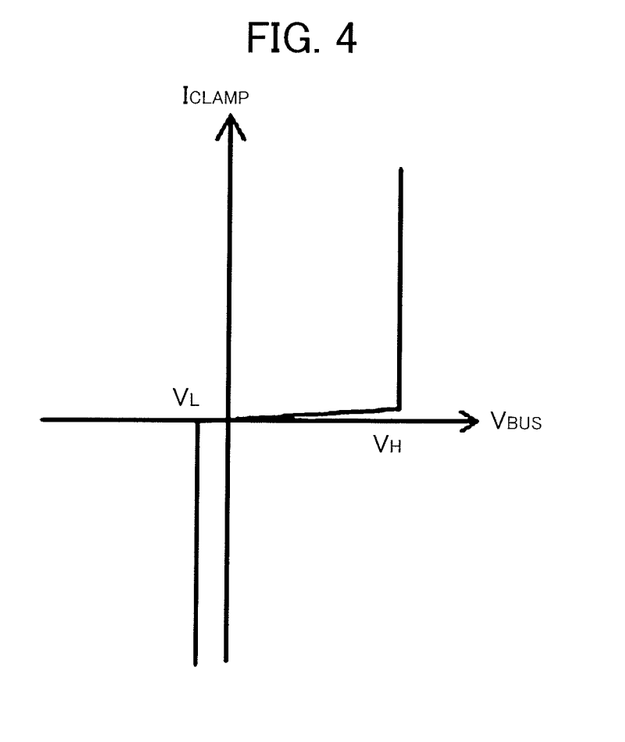
FIG. 4 is an explanatory diagram of a current-voltage characteristic of an overvoltage protection circuit according to the first embodiment of the present invention.

FIG. 4 is an explanatory diagram of a current-voltage characteristic of the overvoltage protection circuit according to the first embodiment of the present invention.

The overvoltage protection circuit is required to have a current-voltage characteristic as shown in FIG. 4 and can be configured with, for example, a Zener diode with a forward voltage of $V_L$ and a breakdown voltage of $V_H$.

When $V_{BUS}$ becomes $V_L$ or $V_H$, voltage $V_{ECU}$-$V_L$ or $V_H$-$V_{ECU}$ is applied to the power line and the power-line current $I_{BUS}$ increases or decreases. This transition ends when $I_{BUS}$ increases by ΔI. During transition period τ, $I_{BUS}$ rapidly changes. Therefore, when the period includes the timing of the level change between the first and second halves at a symbol center of the current signal $I_{TX}$, the control station becomes unable to correctly determine the level difference between the first and second halves. Therefore, to move the transition period away from the symbol center, the timing of switching is adjusted (specifically, delayed) so as to cause the transition current to occur at a symbol boundary away from the symbol center by the timing adjuster 407.

The timing adjuster 407 estimates the transition period τ and outputs PWM2 generated by adjusting the timing of switching signal PWM1 so as to cause the transition current to occur at a symbol boundary. The transition period can be moved most away from the symbol center by aligning the timing of the transition period center to a symbol boundary. In the present embodiment, timing is adjusted to cause switching to be made at a timing τ/2 earlier than the bit boundary.

The further the center of a transition period is from a symbol boundary, the smaller the margin for discrimination of the symbol either before or after the transition period. Namely, when the center of a transition period is nearer to a symbol boundary, the margin for symbol discrimination is larger and, when the center of the transition period coincides with the symbol boundary, the margin becomes maximum. Therefore, the timing adjuster 407 performs timing adjustment so as to bring the timing of a transition period center closer to a symbol boundary (desirably to make them coincide). However, when a sufficient margin can be secured, for example, with a transition period being sufficiently small relative to the period corresponding to each symbol, the timing of a transition period center need not necessarily be made coincide with a symbol boundary. Namely, the timing adjuster 407 may adjust the timing of the switching signal PWM1 so as to make the transition period sufficiently away from the symbol center.

The transition period τ is not a totally unknown value and can be predicted from parameters observable by the slave station. The time rate of change of current $I_{BUS}$ is proportional to the value of voltage applied to the power line and inversely proportional to the value of inductance of the power line. Therefore, based on the assumption that the inductance value is a fixed value free from variation with time, the current transition period width τ can be calculated/estimated from $V_{ECU}$, $V_L$ or $V_H$, and ΔI (=S1).

$I_{BUS}$ shown in FIG. 2 represents a power-line current waveform detected by the control station using the current demodulator 203. Since the communication clocks used between the control station 2 and the slave station 4 are synchronized in advance, it is possible to read a level change paying attention only to the timing of a symbol center and decode the Manchester code as $RX_{ecu}$ based on the direction of the change.

Figure 5:
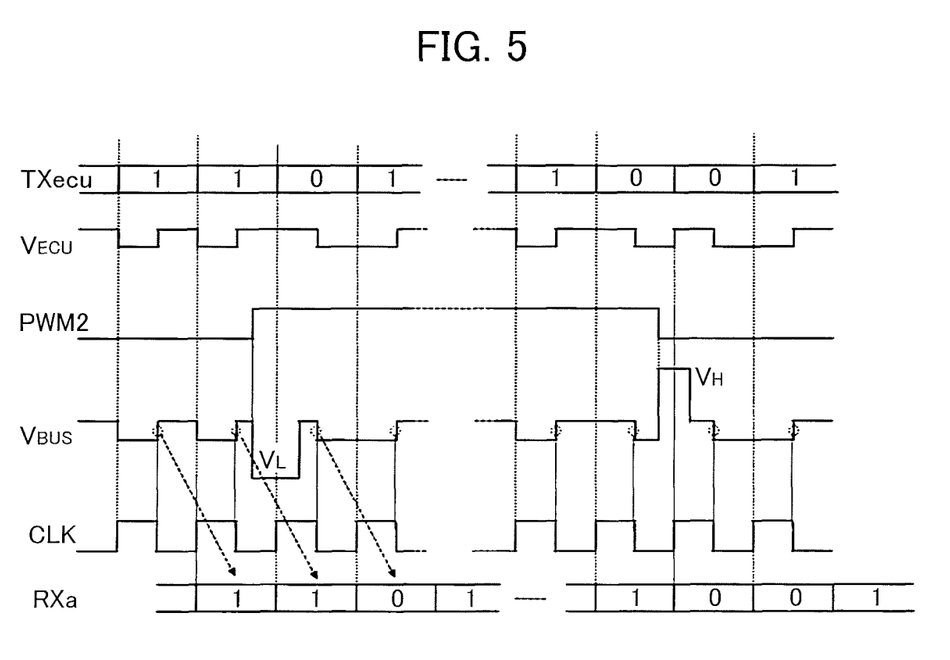
FIG. 5 is a timing chart representing operations during downlink communication from the control station to the slave station according to the first embodiment of the present invention.

FIG. 5 is a timing chart representing operations during downlink communication from the control station 2 to the slave station 4 according to the first embodiment of the present invention.

For downlink communication, voltage communication is performed using the voltage modulator 202. Like in uplink communication, Manchester code is used as a transmission channel code.

For downlink communication, the control station 2 successively sends bit 1 to the slave station 4 before starting communication and, thereby, synchronizes the communication clock of the slave station 4 with the communication clock of the control station 2. By periodically performing this clock synchronization sequence, clock synchronization between the control station 2 and the slave station 4 is maintained.

The voltage $V_{BUS}$ received on the slave station side is clipped to $V_L$ or $V_H$ with the same period width τ as for switching of the actuator 409, but, thanks to the presence of the timing adjuster 407, the level change portion at the symbol center required for code demodulation is not affected by the clipping and reception is possible without communication errors.

Next, a method of acquiring a transition period τ will be described. The actuator slave station 4 may determine the relationship between the power-line voltage, actuator current and transition period τ based on transition periods which occurred and were measured when one or more times of switching were made in the past and the power-line voltage and actuator current values measured when such switchings were made, then, by applying the determined relationship to the power-line voltage and actuator current measured before switching is performed, may calculate (estimate) the transition period τ to result from the switching to be performed.

To be specific, the actuator slave station 4 may, based on transition period values τ which occurred and were measured when plural times of switching were made in the past and power-line voltage and actuator current values measured when the switchings were made, determine an average value of constants to be applied to an equation for calculating a transition period τ based on a power-line voltage and an actuator current. Then, by applying the power-line voltage and actuator current measured before switching is performed and the above determined constant to the equation, the actuator slave station 4 may calculate the transition period τ to occur when the switching is subsequently performed. The method like this will be described in detail later as a second embodiment.

Or, the actuator slave station 4 may, by applying the power-line voltage and actuator current values measured before switching is performed to an equation which includes a predetermined constant, calculate the transition period τ to occur when the switching is subsequently performed and, then, based on the difference between the value of the transition period τ measured after the switching is performed and the calculated transition time τ, may alter the above constant so as to make the difference smaller. The method like this will be described in detail later as a third embodiment.

Alternatively, instead of calculating the transition period τ in the above-described manner each time when performing switching, the actuator slave station 4 may hold a table storing plural sets of power-line voltages, actuator currents, and transition periods τ corresponding to the power-line voltage and actuator current values and may read out the transition period τ corresponding to the power-line voltage and actuator current measured before performing switching. The method like this will be described in detail later as a fourth embodiment.

Second Embodiment

Next, a second embodiment of the present invention will be described. Except for the differences described in the following, parts of the system according to the second embodiment have the same functions as the identically denoted parts shown in FIGS. 1 to 5 of the first embodiment, so that description of such parts will be omitted in the following.

Figure 6:
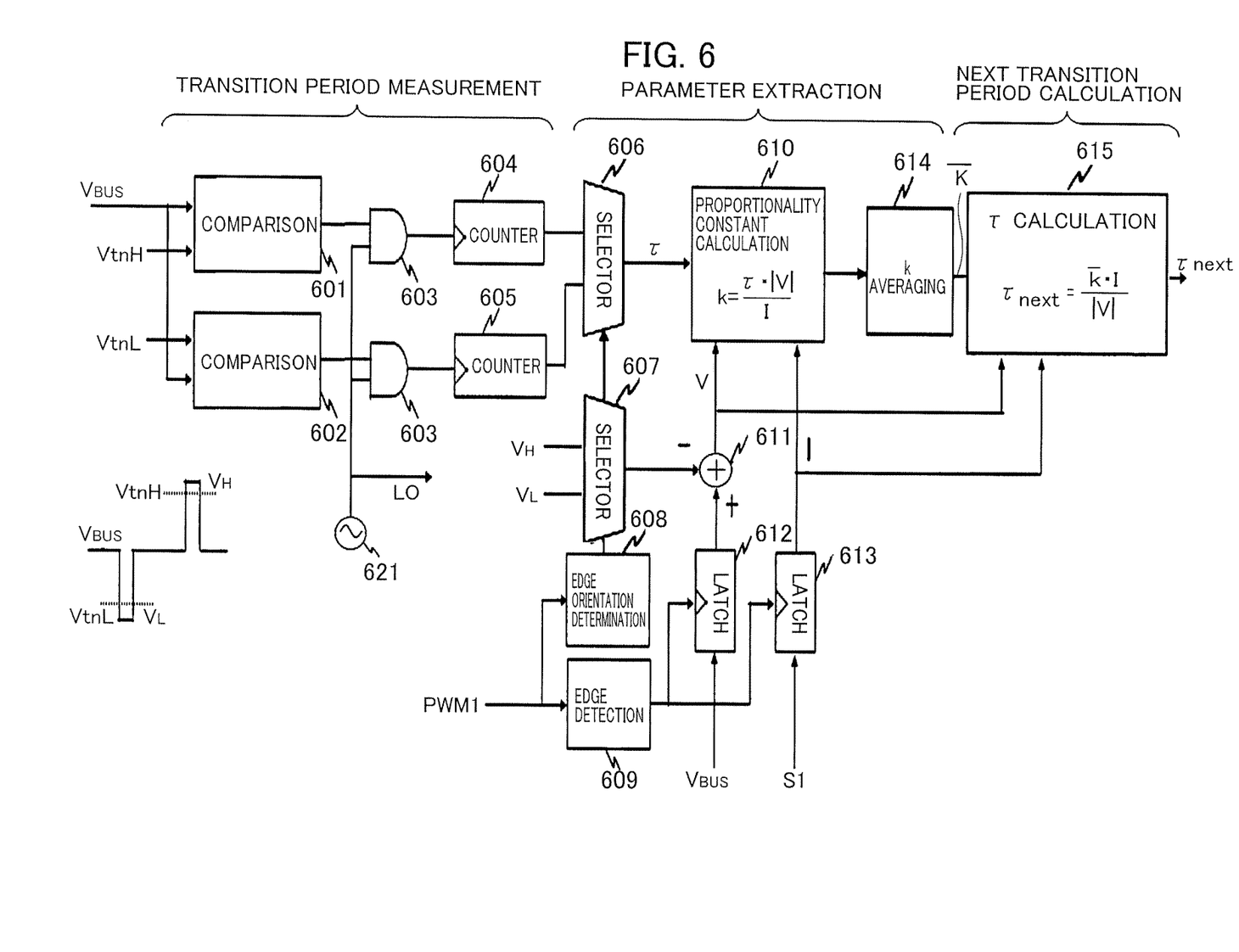
FIG. 6 is a block diagram showing a configuration example of a transition period estimator according to a second embodiment of the present invention.

FIG. 6 is a block diagram showing a configuration example of a transition period estimator 406 according to the second embodiment of the present invention.

The purpose of the transition period estimator 406 is to estimate in advance a period width τ of the transition current to be generated after actuator switching by the inverter 408. Making use of the fact that τ is proportional to current variation width ΔI and inversely proportional to potential difference $V_{ECU}$-$V_{BUS}$, the transition period estimator 406 shown in FIG. 6 calculates proportionality constant k by measuring a generated transition width and current and voltage values during the transition width, then, based on the k and the current and voltage values, calculates τ corresponding to the next switching.

The transition period estimator 406 includes broadly divided three parts, i.e., a transition period measurement unit for measuring τ, a parameter extraction unit for calculating k, and a next transition period calculation unit for calculating the transition period width τ corresponding to the next switching.

In the transition period measurement unit, a comparator 601 compares the magnitude of $V_{BUS}$ with the reference voltage $V_{thH}$ and $V_{thL}$ and, thereby, detects that $V_{BUS}$ is clamped to $V_H$ or $V_L$. Since the clamp voltages $V_H$ and $V_L$ of the voltage protection circuit 401 are parameters determined at the time of circuit design, threshold voltages $V_{thH}$ and $V_{thL}$ for detecting that $V_{BUS}$ has reached a clamp voltage are given as constants to comparators 601 and 602. By setting a voltage slightly lower than $V_H$ as a threshold $V_{thH}$ and a voltage slightly higher than $V_L$ as a threshold $T_{thL}$, when $V_{BUS}$ is higher than $V_{thH}$ or lower than $V_{thL}$, the transition period measurement unit can determine that $V_{BUS}$ has reached $V_H$ or $V_L$ (i.e., clamp voltage). The transition period measurement unit includes an oscillator 621 which oscillates in a cycle shorter than the transition period τ and, using AND gate 603, counter 604 and counter 605, converts the time during which current is transitioning with $V_{BUS}$ clamped, i.e., τ, into a digital value.

The adjacent parameter extraction unit is a block to calculate proportionality constant k. In the parameter extraction unit, an edge detector 609 detects a rising edge or a falling edge of the switching signal PWM1 and outputs a one-shot pulse. Each edge of PWM1 is famed immediately before the inverter switches the actuator and, at this time, $V_{ECU}$=$V_{BUS}$ and ΔI=S1 required for calculating the transition period τ are acquired at latches 612 and 613.

An edge orientation determiner 608 determines whether an edge of PWM1 is a rising edge or a falling edge and, depending on the determination result, controls selectors 607 and 606. When an edge of PWM1 is a rising edge, current $I_{INV}$ of the inverter 408 rises and $V_{BUS}$ is clamped to $V_L$, causing the selector 606 to output the value of τ outputted from the counter 605 and the selector 607 to output the value of $V_L$. Conversely, when the edge of the PWM1 is a falling edge, the selector 606 outputs the value of τ outputted from the counter 604 and the selector 607 outputs the value of $V_H$. Note that, depending on the configuration of the inverter, the relationship between the edge orientation of PWM1 and the polarity of $I_{INV}$ is reversed.

A proportional constant calculator 610 calculates proportionality constant k using equation (1) based on voltage V calculated by an adder 611 and applied, when switching is made, to the power line between the control station 2 and the slave station 4, current variation amount I=ΔI and transition period width τ of the current generated after switching.

$$k = \frac{\tau \cdot |V|}{I} \quad (1)$$

Also, the measured values of V, I and τ include noise on the power line and measurement noise, so that values of k each calculated based on the result of one time of switching vary. Therefore, for the purpose of removing the effects of such noise and improving the accuracy of k, the parameter extraction unit includes an averaging unit 614 which obtains values of k corresponding to plural times of switching and processes the values of k for averaging.

The next transition period calculation unit includes a τ calculator 615. The τ calculator 615 receives values of V and I at the timing of an edge of the switching signal PWM1 and an average value of k outputted from the parameter extraction unit, then calculates, using equation (2), the transition current period width $\tau_{next}$ that occurs when the edge of PWM1 switches the actuator by driving the inverter.

$$\tau_{next} = \frac{k \cdot I}{|V|} \quad (2)$$

Figure 7:
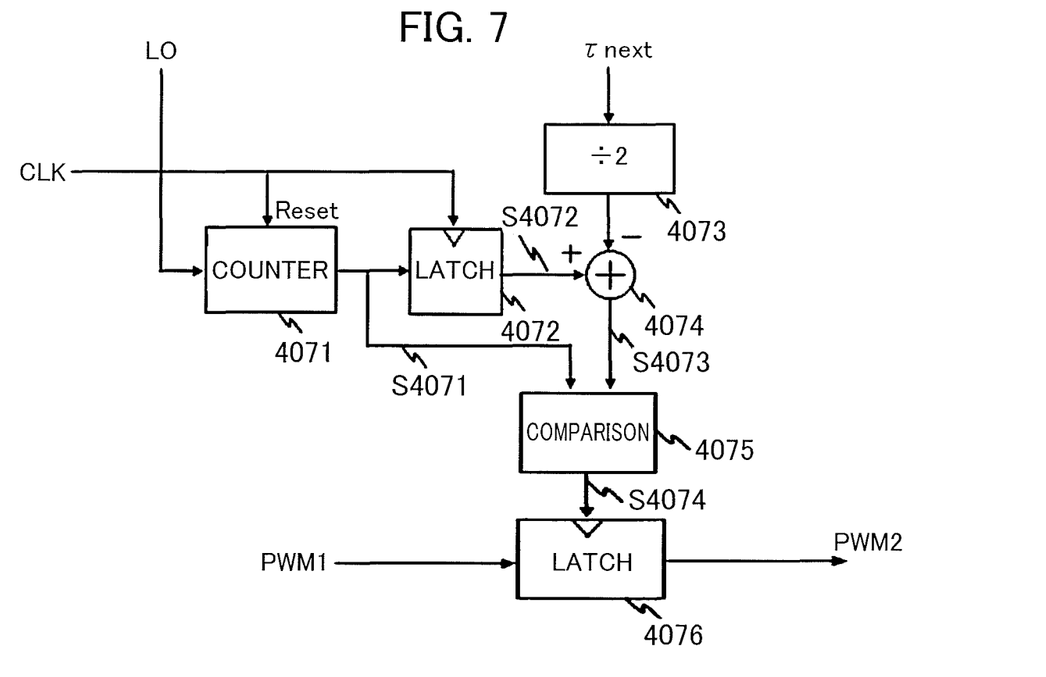
FIG. 7 is a block diagram showing a configuration example of a timing adjuster according to the second embodiment of the present invention.
Figure 8:
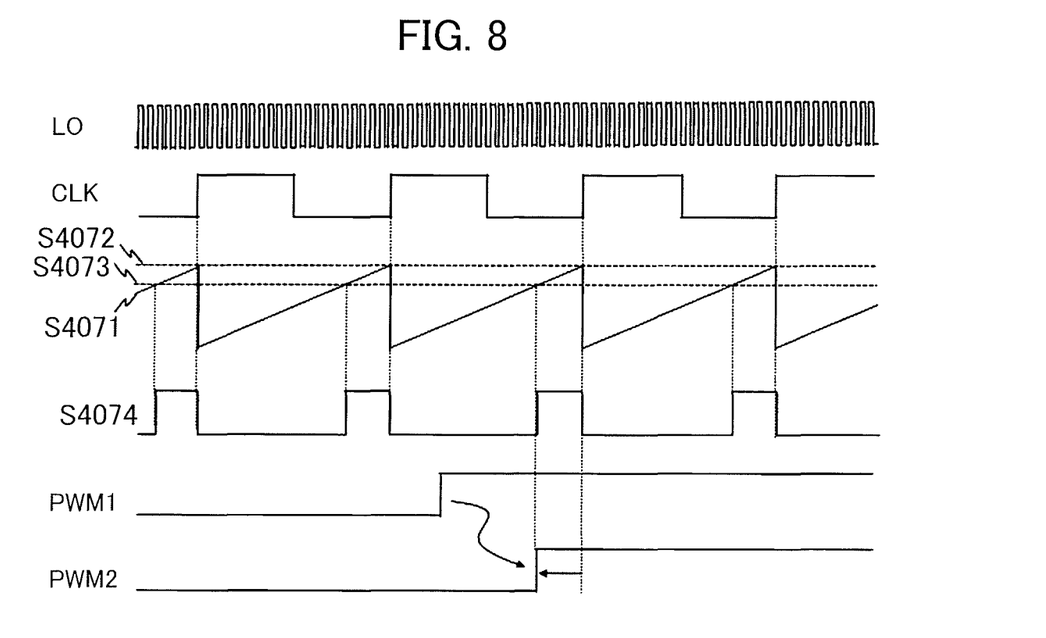
FIG. 8 is a timing chart showing operation timings of the timing adjuster of the second embodiment of the present invention.

FIG. 7 is a block diagram showing a configuration example of the timing adjuster 407 according to the second embodiment of the present invention. FIG. 8 is a timing chart showing operation timings of the timing adjuster 407 of the second embodiment of the present invention.

A counter 4071 counts up clock LO of the oscillator 621 sent from the transition period estimation unit and is reset to 0 every time the communication clock CLK rises. A latch 4072 acquires a maximum counter value S4072 for each communication clock by latching the counter output S4071 each time CLK rises. An adder 4074 outputs to a comparator 4075 a value S4073 obtained by subtracting $T_{next}$, halved by a divider 4073, from sawtooth-wave peak value S4072.

The comparator 4075 compares sawtooth waves S4071 and S4073, and S4074 triggers a rising latch 4076 when S4073 exceeds S4071. With the above configuration, PMW1 is latched at a timing earlier by $\tau_{next}/2$ than the communication clock CLK, and a re-timed switching signal PWM2 is outputted.

Third Embodiment

Next, a third embodiment of the present invention will be described. Except for the differences described in the following, parts of the system according to the third embodiment have the same functions as the identically denoted parts shown in FIGS. 1 to 8 of the first and second embodiments, so that description of such parts will be omitted in the following.

Figure 9:
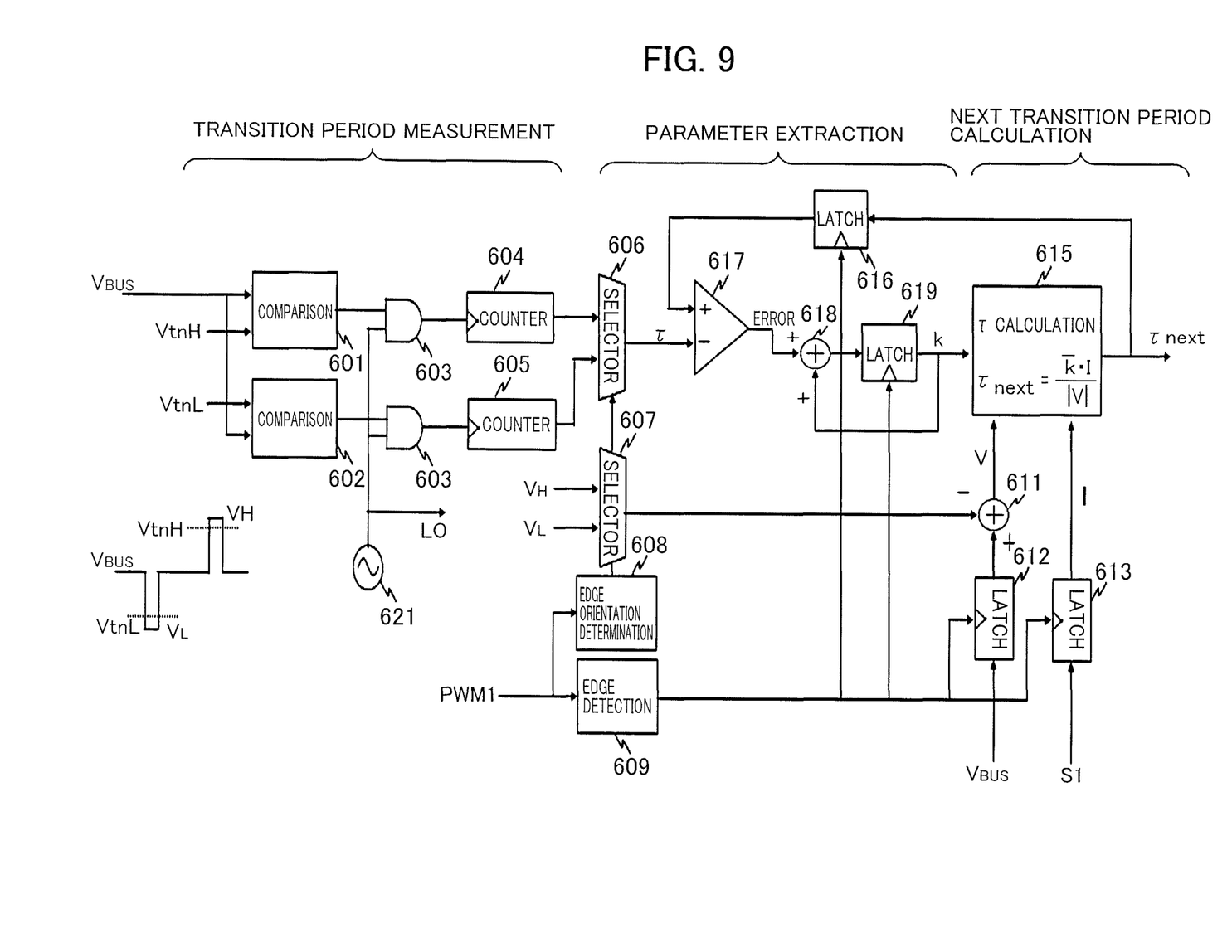
FIG. 9 is a block diagram showing a configuration example of a transition period estimator according to a third embodiment of the present invention.

FIG. 9 is a block diagram showing a configuration example of a transition period estimator 406 according to the third embodiment of the present invention.

In the configuration example shown in FIG. 9, the parameter extraction unit determines proportionality constant k, not by calculation using a relational expression between V and I, but by comparing a measured value of τ with a value estimated using k and performing feedback processing to minimize the error. In the configuration of the present embodiment, the division by I to be performed at the proportionality constant calculator 610 is not necessary, so that, compared with the second embodiment, the circuit scale and operation time can be reduced.

As will be described later, the τ calculator 615 of the present embodiment calculates $\tau_{next}$ by equation (3) which includes a division. However, in cases where $V_{ECU}$ representing voltage supplied by the control station 2 is a fixed value or a known value, the value of V to be the denominator is fixed, so that it can be incorporated into proportionality constant k. This follows that the τ calculator 615 need not include a divider.

However, in the present embodiment, unlike in the foregoing second embodiment, it is necessary to perform some switching operations until k converges to an optimum value. As a countermeasure, it is possible for the control station or the slave station to determine in advance an appropriate value as an initial value of k and to reduce the convergence time.

The parameter extraction unit of the present embodiment will be described. The error amplifier 617 outputs the difference between a measured value τ of the transition period width outputted from the selector 606 and an estimated value of τ, i.e., $\tau_{next}$ held by the latch 616 as an error. The adder 618 and the latch 619 form an accumulator and hold k as an accumulated value. By increasing the value of k when the estimated τ is smaller than the measured τ and, conversely, decreasing the value of k when the estimated τ is larger, a value of k which makes it possible to calculate a value of τ with a smallest error is learned.

The τ calculator 615 included in the next transition period calculation unit of the present embodiment calculates $\tau_{next}$ using equation (3) using the value of k learned by the parameter extraction unit.

$$\tau_{next} = \frac{k \cdot I}{|V|} \quad (3)$$

Fourth Embodiment

Next, a fourth embodiment of the present invention will be described. Except for the differences described in the following, parts of the system according to the fourth embodiment have the same functions as the identically denoted parts shown in FIGS. 1 to 9 of the first to third embodiments, so that description of such parts will be omitted in the following.

Figure 10:
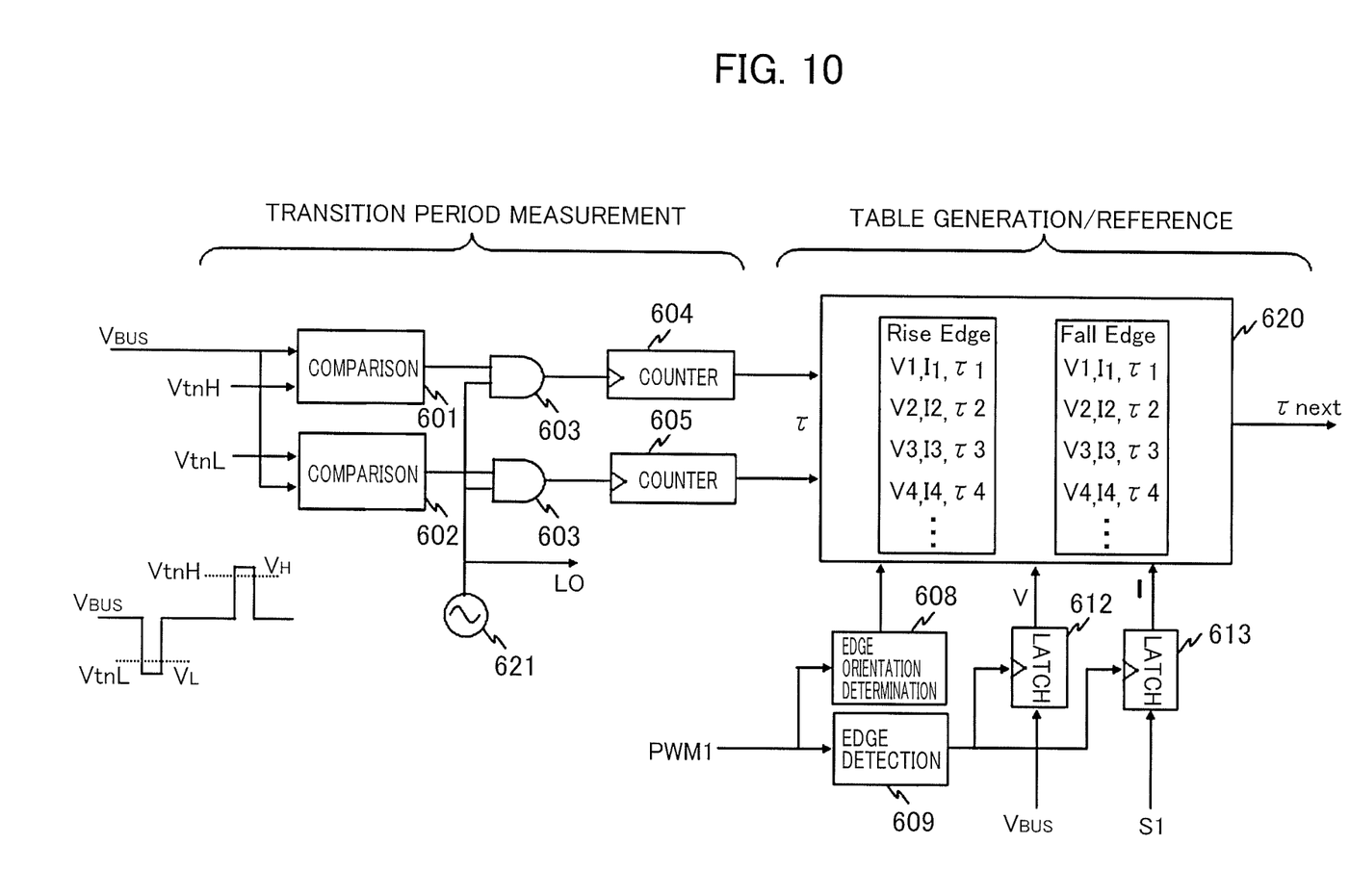
FIG. 10 is a block diagram showing a configuration example of a transition period estimator according to a fourth embodiment of the present invention.

FIG. 10 is a block diagram showing a configuration example of the transition period estimator 406 according to the fourth embodiment of the present invention.

The transition period estimator 406 of the fourth embodiment does not include the parameter extraction unit and the next transition period calculation unit included in the transition period estimator 406 of the second and third embodiments and, instead, includes a table generation/reference unit. In the present embodiment, the concept of the proportionality constant k does not exist. Table 620 holds, corresponding to each inverter edge orientation, values of power-line voltage $V_{BUS}$ and actuator current S1 measured immediately before switching on the slave station side and values of transition current period width τ estimated to result from immediately subsequent switching and is stored in memory in the actuator slave station 4. Every time switching is to be made, the memory is read to output $τ_{next}$.

The table to be stored in memory is generated by varying, in advance test mode, voltage and current values and measuring τ corresponding to the respective voltage and current values. As in the third embodiment, when power-line voltages are fixed or known, the three parameters V, I, and τ to be stored in memory may be reduced to two, i.e., I and τ, to reduce the memory size requirement.

In the present embodiment, no linear model is applied to the relationship between current/voltage and transition time, so that τ can be estimated more accurately than in the second and third embodiments. As described above, the table may be generated in test mode, but, when the slave station location on the power line is specified, a table prepared in a ROM may be used. In this case, the transition period measurement unit is not required.

Fifth Embodiment

Next, a fifth embodiment of the present invention will be described. Except for the differences described in the following, parts of the system according to the fifth embodiment have the same functions as the identically denoted parts shown in FIGS. 1 to 10 of the first to fourth embodiments, so that description of such parts will be omitted in the following.

Figure 11:
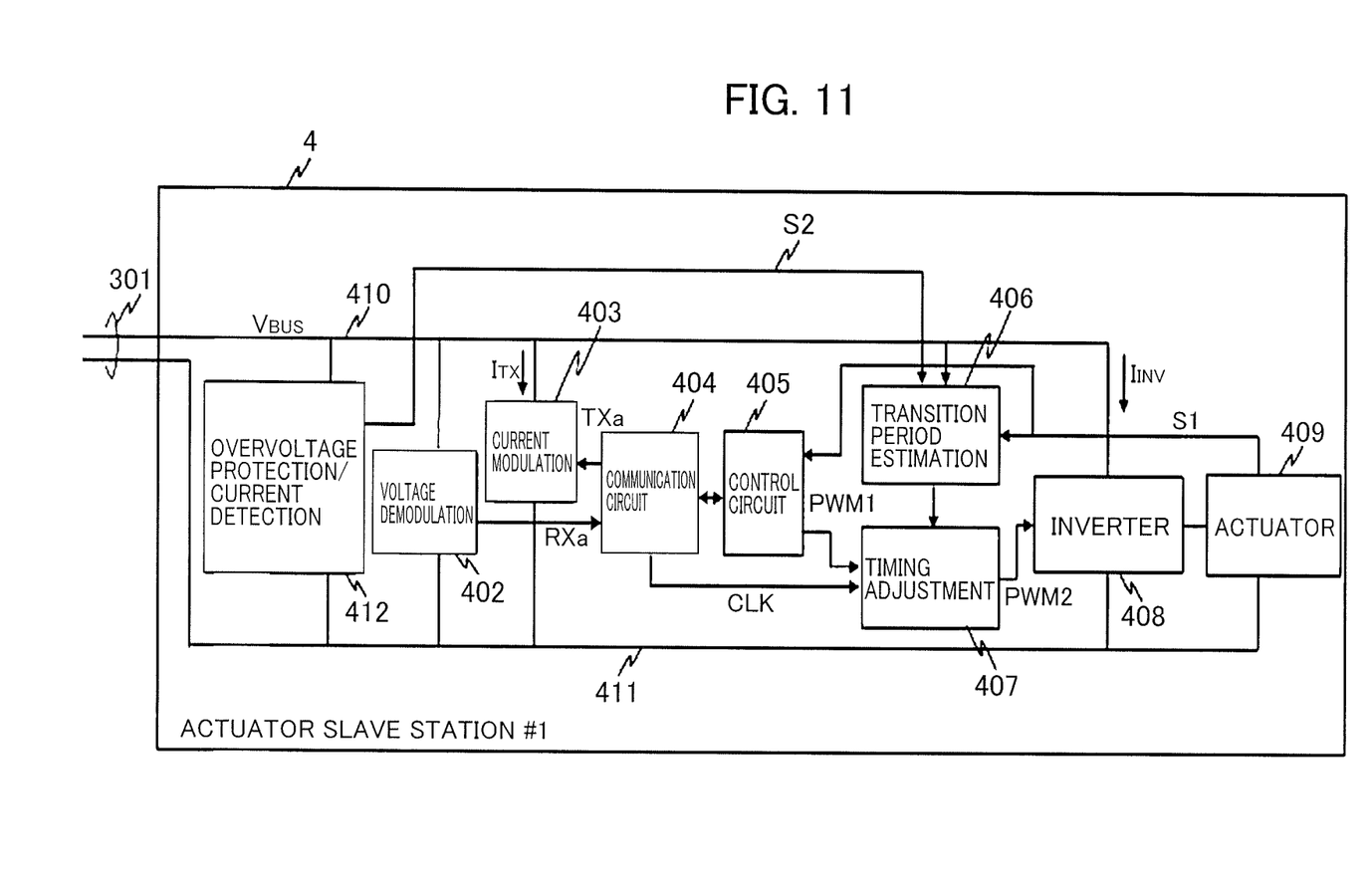
FIG. 11 is a block diagram showing a configuration example of an actuator slave station of a fifth embodiment.

FIG. 11 is a block diagram showing a configuration example of the actuator slave station 4 according to the fifth embodiment.

The present embodiment differs from the first embodiment in that the overvoltage protection/current detector 412 is included instead of the overvoltage protection circuit 401 making it possible for the transition period estimator 406 to detect current S2 flowing through the overvoltage protection/current detector 412. In the configuration of the first embodiment in which τ is measured based on $V_{BUS}$, it is necessary, as described in connection with the transition period measurement unit of the second to fourth embodiments, to prepare as threshold values voltage $V_{thL}$ slightly higher than $V_L$ and voltage $V_{thL}$ slightly lower than $V_H$ for use in detecting that $V_{BUS}$ has reached clamp voltage $V_L$ or $V_H$. This, however, poses a restriction that $V_L$ and $V_H$ must be known and reduces design freedom. As shown in the timing chart of FIG. 2, the bus current transition period is also the period during which current flows to the overvoltage protection circuit 401, so that it is possible to measure τ by detecting the presence or absence of the current $I_{CLAMP}$. Hence, in the present embodiment, $I_{CLAMP}$ is used to measure transition period width τ. In the transition period measurement unit included in the transition period estimator 406 of the present embodiment, $I_{CLAMP}$, not $V_{BUS}$, is observed in all cases and comparators 601 and 602 only determine whether the value is positive or negative. For example, it is possible to set a sufficiently small threshold value and to determine, when the absolute value of $I_{CLAMP}$ is larger than the threshold value, that $I_{CLAMP}$ is present. However, in cases where a resistor is inserted as a current detector in the overvoltage protection circuit, the impedance of the overvoltage protection circuit becomes high and, when a surge current flows, voltage rising cannot be suppressed. The problem like this does not occur in the first embodiment.

The actuator shown in the foregoing first to fifth embodiments is an example of a load, and the system shown in FIG. 1, for example, is an example of a system to drive a load. The present invention can be applied, not only to actuators, but also to any type of load driven by switching the supply of power from a power line.

The present invention is not limited to the embodiments described above and includes various modifications. For example, the above embodiments have been described in detail for better understanding of the present invention and are not necessarily limited to those including all the described configurations. Also, a part of the configuration of one embodiment can be replaced by the configuration of another embodiment, and the configuration of one embodiment can be added to by the configuration of another embodiment. Furthermore, with respect to a part of the configuration of each embodiment, addition, deletion and replacement using another embodiment is possible.

Further, each of the configurations, functions, processing units, processing means, etc. described above may be realized by hardware, for example, by designing a part or all of them with an integrated circuit. Also, each configuration, function, and the like described above may be realized by software, i.e., by having a processor to interpret and execute programs for realizing their respective functions. Information such as programs, tables, and files for realizing each function can be stored in a storage device such as a non-volatile semiconductor memory, a hard disk drive, and a solid state drive (SSD), or in a computer readable non-temporary data storage medium such as an IC card, an SD card, or a DVD.

Further, the control lines and information lines indicated are those considered necessary for description purposes, and they do not necessarily represent all the control lines and information lines included in products.

The invention claimed is:

1. A load drive system for driving a load supplied with power from a power line, comprising,
a control unit which controls switching between the power line and the load and a communication unit which communicates using voltage and current of the power line,
wherein, when performing the switching, the control unit controls, based on a width of a transition period of the power-line current, the transition period being attributable to the switching, timing of the switching so as to move the transition period away from a center of a period corresponding to a symbol communicated by the communication unit.

2. The load drive system according to claim 1,
wherein the communication unit communicates as a value of each symbol a value represented by a level difference between the power line voltage and current in a first half and the power line voltage and current in a second half of the period corresponding to each symbol, and
wherein the control unit controls timing of the switching by delaying the timing of the switching so as to move the center of the transition period closer to a boundary between periods corresponding to two adjacent symbols.

3. The load drive system according to claim 1,
wherein, when performing the switching, the control unit calculates the width of the transition period based on measured values of the power-line voltage and current flowing through the load.

4. The load drive system according to claim 3,
wherein the control unit:
based on a measured value of the width of the transition period attributable to at least one time of the switching performed in the past and the power line voltage and the load current at the time of the at least one time of the switching performed in the past, determines relationship between the power-line voltage, the load current and the transition-period width, and
calculates the width of the transition period attributable to the switching based on the determined relationship and the measured values of the power-line voltage and the load current.

5. The load drive system according to claim 4,
wherein the control unit:
based on measured values of the width of the transition period attributable to a plurality of times of the switching performed in the past and values of the power line voltage and load current at the times of the plurality of times of the switching performed in the past, determines an average constant value to be applied to an equation for calculating the transition period width based on the power-line voltage and load current, and
calculates the width of the transition period attributable to the switching by applying the determined average constant value and the measured values of the power-line voltage and load current to the equation.

6. The load drive system according to claim 4,
wherein the control unit:
calculates the width of the transition period attributable to the switching by applying the measured values of the power-line voltage and load current to an equation including a predetermined constant; and,
based on a difference between the calculated width of the transition period and a measured value of the width of the transition period that occurred after the switching, changes the constant so as to reduce the difference.

7. The load drive system according to claim 1,
further comprising a storage unit which stores a plurality of sets of the power-line voltage, the load current and the width of the transition period corresponding to the power-line voltage and the load current, and
wherein the control unit, when performing the switching, reads from the storage unit the width of the transition period corresponding to a measured value of the power-line voltage and a measured value of the load current.

8. The load drive system according to claim 7,
wherein, based on measured values of the width of the transition period attributable to a plurality of times of the switching performed in the past and values of the power-line voltage and load current at the times of the plurality of times of the switching performed in the past, determines a plurality of sets of values of the power-line voltage and the load current and values of the width of the transition period corresponding to the values of the power-line voltage and load current and stores the determined plurality of sets of values in the storage unit.

9. The load drive system according to claim 4,
further comprising an overvoltage protection unit which limits the power-line voltage to a range from a predetermined lower limit value to a predetermined upper limit value,
wherein the control unit acquires, as measured values of the width of the transition period, a width of a period at a time when it is determined that the power-line voltage has reached the upper limit value and a width of a period at a time when it is determined that the power-line voltage has reached the lower limit value.

10. The load drive system according to claim 4,
further comprising an overvoltage protection unit which limits the power-line voltage to a range from a predetermined lower limit value to a predetermined upper limit value,
wherein the control unit acquires a width of a period during which current is flowing through the overvoltage protection unit as a measured value of the width of the transition period.

11. A load drive method for driving a load with a load drive system supplied with power from a power line,
the load drive system comprising a control unit which controls switching between the power line and the load and a communication unit which communicates using voltage and current of the power line,
the load drive method comprising:
a step of acquiring, when performing the switching, a width of a transition period of current of the power line, the transition period being attributable to the switching, and
a step of controlling, based on the acquired width of the transition period, timing of the switching so as to move the transition period away from a center of a period corresponding to a symbol communicated by the communication unit.

* * * * *